July 14, 1942.　　　C. B. SMITH ET AL　　　2,290,131
SAFETY DEVICE FOR GLASS-BLOWING MACHINES
Filed Feb. 14, 1940　　　3 Sheets-Sheet 2

C. B. Smith
A. G. Lauck
INVENTORS

BY Reele & Hoge
ATTORNEYS

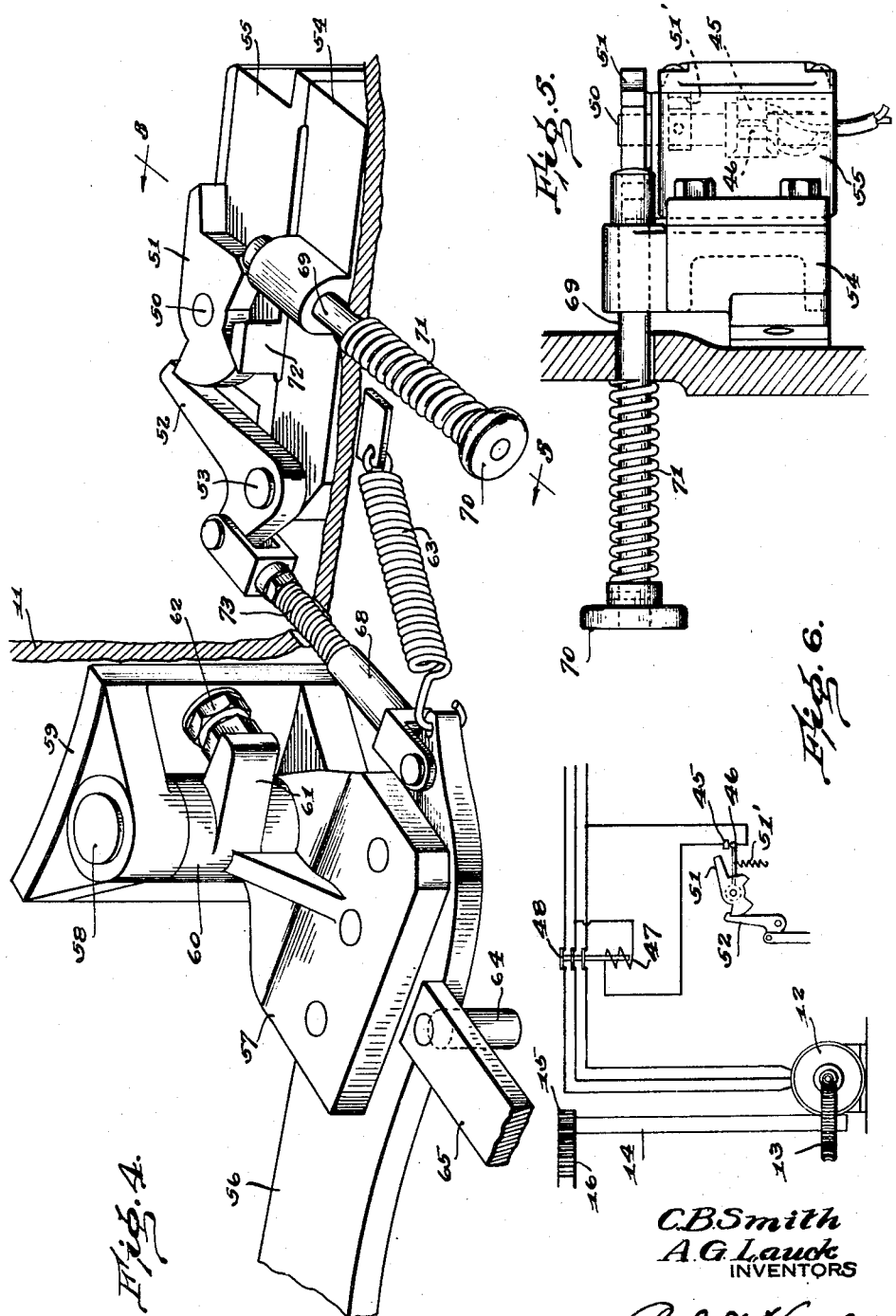

Patented July 14, 1942

2,290,131

UNITED STATES PATENT OFFICE 2,290,131

SAFETY DEVICE FOR GLASS BLOWING MACHINES

Charles B. Smith and Albert G. Lauck, Alton, Ill., assignors to Owens-Illinois Glass Company, a corporation of Ohio Application February 14, 1940, Serial No. 318,902

6 Claims. (Cl. 49—14)

Our invention relates to safety mechanism for use with a power driven machine and operable automatically to stop the machine upon failure of a part thereof to normally operate. More particularly, the invention comprises a safety device associated with a glass blowing machine driven by an electric motor and operable to cut off the current supply to the motor and stop the machine when a mold operating mechanism on the machine fails to operate owing to some obstruction or other cause.

An object of the invention is to provide a safety device operable to stop the machine upon failure of the mold closing arms to operate and thereby preventing interference between operating parts of the mechanism and insuring correction of the trouble before the machine is again operated.

The invention is herein illustrated as particularly adapted for use with an automatic glass blowing machine of the Owens suction type and comprises a safety device automatically operated to break the circuit of the driving motor upon failure of any pair of mold closing arms to normally close.

Referring to the accompanying drawings:

Fig. 4 is a perspective view of the safety mechanism;

Fig. 5 is a section at the line 5—5 of Fig. 4, showing particularly the means for resetting the safety device; and Fig. 6 is a diagrammatic view of the driving motor and electrical circuits and controls.

Figure 1:
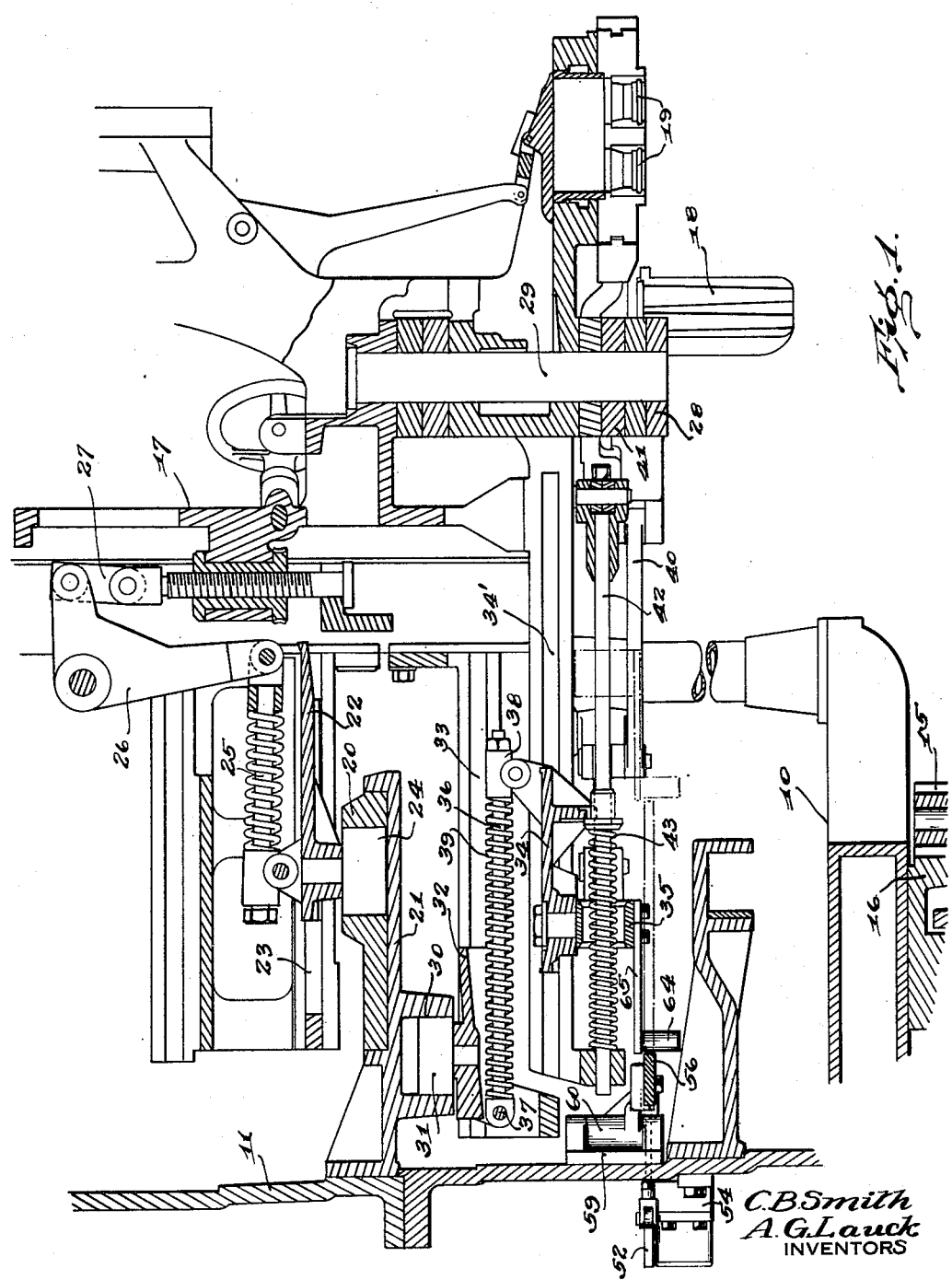
Fig. 1 is a fragmentary sectional elevation of a machine to which the invention is applied, the section being taken through one of the mold carrying heads or units of the machine.

Referring particularly to Fig. 1, the invention is herein shown as applied to a conventional glass blowing machine of the Owens suction type, such machine including a mold carriage 10 which is rotated continuously about the axis of a stationary center column 11 on which the carriage is mounted. A machine of this type is shown, for example, in the patent to La France, 1,185,-687, June 6, 1916, to which reference may be had for a detailed disclosure of the construction and operation of the machine. The carriage is rotated by an electric motor 12 (Fig. 6) which operates through worm gearing 13, vertical shaft 14 and driving pinion 15 to drive a ring gear 16 (Figs. 1 and 6) attached to the mold carriage.

A mold carrying head or unit as shown in Fig. 1 and which is one of an annular series of such units, includes a dip frame 17 mounted for up and down movement on the mold carriage for lifting and lowering the blank mold 18 and neck mold 19. The means for lifting and lowering the dip frame includes a cam track 20 mounted on a stationary cam plate 21 supported on the column 11. A slide block 22 is mounted for reciprocating movement radially of the carriage in guideways 23 and carries a cam roll 24 running on the track 20. A link 25 connects the slide block with a bell crank 26 having a link connection 27 with the dip frame 17. The blank mold 18 comprises partible sections carried on blank mold arms 28 mounted to swing about a pivot pin 29 for opening and closing the blank mold. The latter when closed registers with the neck mold 19.

The means for opening and closing the blank mold comprises a cam track 30 formed on the under side of the cam plate 21, in which track runs a cam roll 31 carried by a slide 32 mounted to reciprocate radially of the machine in guideways 33. The slide 32 has an operating connection with a slide 34 mounted to reciprocate radially of the machine in guideways 34' and having pivotally connected thereto an equalizing yoke 35. The connection between the slides 32 and 34 includes a rod 36 pivoted at 37 to the slide 32. A sleeve 38 slidably mounted on said rod is pivotally connected to the slide 34. A coil spring 39 mounted on the rod 36 and held under compression provides a yieldable connection, permitting idle movement of the slide 32 in the event of any obstruction which would prevent normal movement of the yoke 34 for closing the blank mold. Operating connections 40 are provided between the yoke 35 and blank mold arms 28. The sections of the neck mold 19 are carried on neck mold arms 41 having operating connections with a rod 42 which is operated by the slide 34 for opening the neck molds and a spring 43 for closing the neck molds in a conventional manner.

The mechanism thus far described and designated by reference numerals is of standard construction in machines of the type indicated and in itself forms no part of the present invention. The safety mechanism will now be described. Such mechanism includes a pair of contacts 45 and 46 (Figs. 2, 3, 5 and 6) in a relay circuit comprising a relay 47 (Fig. 6) for actuating a switch 48 in the circuit of the motor 12. The switch contact 46 is carried on a rock arm 49 fixed to a rock shaft 50 to which is also secured a switch operating lever 51. The switch lever 51 is normally held in position to maintain the contacts 45, 46 together by means of a latch 52 mounted by a pivot pin 53 on a stationary bracket 54 bolted to the inner surface of the column 11. The lever 51 is mounted on a switch box 55 bolted to the bracket 54 and containing the switch contacts 45, 46.

Figures 2, 3:
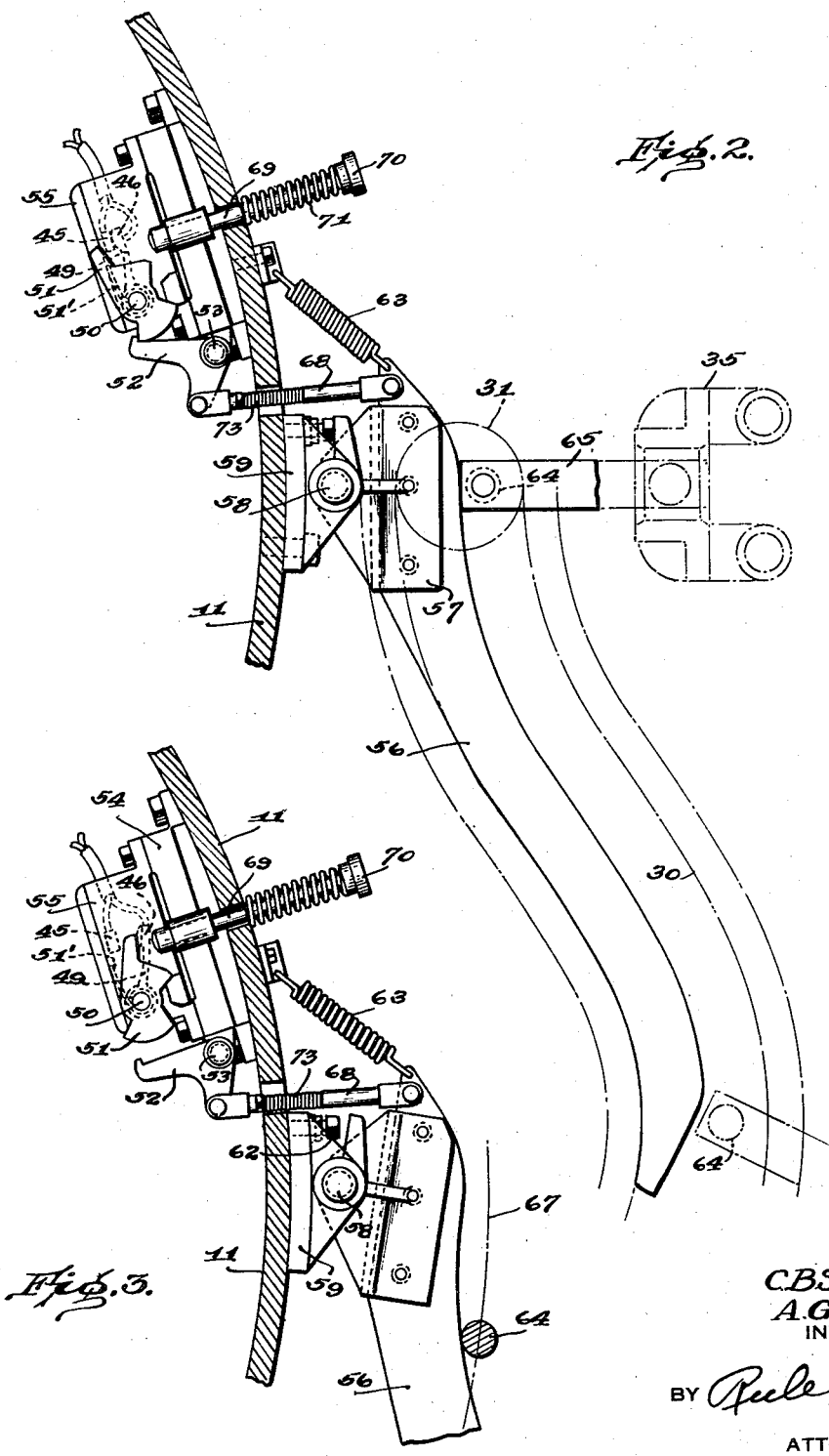
Fig. 2 is a part sectional plan view illustrating the safety mechanism, the parts being in the relative position assumed during normal operation of the machine.
Fig. 3 is a view similar to Fig. 2 but showing the parts in the position assumed when the safety device has been tripped to open the motor circuit.

Mechanism for tripping the latch 52 includes a rock arm 56 carried by a plate or bracket 57, the latter mounted to rock about the vertical axis of a pivot pin 58 carried on a bracket 59 bolted to the column 11. The plate 57 is formed with an integral bearing sleeve 60 by which it is journalled on the pin 58. A rock arm 61 integral with the sleeve 60 is adapted to engage an adjustable stop 62 on the bracket 59 and thereby limit the outward swinging movement of the arm 56 and determine its normal position. The arm is held in said position by a coil spring 63. The rock arm 56 as shown in Fig. 2 is curved to conform to the curvature of the cam track 30 and extends in substantial parallelism therewith, being in a plane some distance below the cam track.

The means for actuating the trip includes an actuating device in the form of a pin 64 carried on an arm 65 (see Fig. 1) attached to the yoke 35. During the normal operation of the machine the yoke 35 is in the position shown in Figs. 1 and 2 while the blank mold is open. As the mold carriage advances from such position the cam roll 31 traveling along the cam track 30 is moved radially outward and operates to close the blank mold. In the event of any obstruction or interference with the closing movement of the blank mold, the cam roll 31 while moving along the cam track to the mold closing position will compress the spring 39 without any outward movement of the yoke 35. The yoke will therefore travel in an arc concentric with the axis of the machine. The pin 64 will also travel in an arc 67 (Fig. 3) concentric of the machine and thereby cam the rock arm 56 inwardly. This movement of the rock arm about the pivot 58 operates through a connecting rod or link 68 to trip the latch 52, releasing the switch lever 51 and permitting it to be moved by a spring 51' (Fig. 2) into position to separate the switch contacts 45, 46. The circuit of the relay 47 being thus broken, the switch 48 is opened, thereby cutting off the current supply to the motor and stopping the machine. In this manner interference and breakage of parts of the machine, owing to the failure of the blank mold arms to close, is prevented. Possible interference between the moving parts of the machine and the gathering tank is also prevented. The machine will remain at rest until the conditions preventing the normal closing of the mold have been corrected. The safety device can then be reset.

The resetting means comprises a hand operated rod 69 provided with a knob 70. The rod is mounted for lengthwise movement on the bracket 54 and is held in its retracted position by a coil spring 71. When the rod is pushed inwardly the inner end thereof engages the lever 51 and rocks it into position to be again engaged by the latch 52. A stop 72 limits the movement of the lever 51. The link 68 may include extensible sections and a coil spring 73, permitting the latch 52 to be snapped into position.

Modifications may be resorted to within the spirit and scope of our invention.

We claim:

1. A machine for forming glass articles comprising a stationary column, a mold carriage mounted for rotation about the vertical axis of said column, a mold on the carriage, mold operating mechanism mounted on the carriage for rotation therewith, said mechanism including a cam roll, a stationary horizontal cam track defining a path for the cam roll in its travel around said column and on which said roll runs, means on the mold carriage for guiding the cam roll radially toward and from said axis when actuated by the cam, safety mechanism for stopping the mold carriage upon failure of said mold operating mechanism normally to operate the mold, an actuating device for said safety mechanism, said device being connected to the mold operating mechanism to travel with the mold carriage and to move radially of the machine with the cam roll, and means actuated by said device for operating the safety mechanism upon failure of said device to move radially with the cam roll.

2. A machine for forming glass articles comprising a stationary column, a mold carriage mounted for rotation about the vertical axis of said column, a mold on the carriage, mold operating mechanism mounted on the carriage for rotation therewith, said mechanism including a cam roll, a stationary horizontal cam track defining a path for the cam roll in its travel around said column and on which said roll runs, means on the mold carriage for guiding the cam roll radially toward and from said axis when actuated by the cam, safety mechanism for stopping the mold carriage upon failure of said mold operating mechanism normally to operate the mold, an actuating device for said safety mechanism, said device being connected to the mold operating mechanism to travel with the mold carriage and to move radially of the machine with the cam roll, and means actuated by said device for operating the safety mechanism upon failure of said device to move radially with the cam roll, said mold operating mechanism including spring means permitting the cam roll to be moved radially of the machine by said cam without operating the mold and without radial movement of said actuating device when normal operation of the mold is prevented.

3. A machine for forming glass articles comprising a stationary column, a mold carriage mounted for rotation about the vertical axis of said column, a mold on the carriage, mold operating mechanism mounted on the carriage for rotation therewith, said mechanism including a cam roll, a stationary horizontal cam track defining a path for the cam roll in its travel around said column and on which said roll runs, means on the mold carriage for guiding the cam roll radially toward and from said axis when actuated by the cam, safety mechanism for stopping the mold carriage upon failure of said mold operating mechanism normally to operate the mold, an actuating device for said safety mechanism, said device being connected to the mold operating mechanism to travel with the mold carriage and to move radially of the machine with the cam roll, and means actuated by said device for operating the safety mechanism upon failure of said device to move radially with the cam roll, said last mentioned means comprising a cam movably mounted on said column and extending in substantial parallelism with said cam track.

4. A machine for forming glass articles comprising a stationary column, a mold carriage mounted for rotation about the vertical axis of said column, a mold on the carriage, mold operating mechanism mounted on the carriage for rotation therewith, said mechanism including a cam roll, a stationary horizontal cam track defining a path for the cam roll in its travel around said column and on which said roll runs, means on the mold carriage for guiding the cam roll radially toward and from said axis when actuated by the cam, safety mechanism for stopping the mold carriage upon failure of said mold operating mechanism normally to operate the mold, an actuating device for said safety mechanism, said device being connected to the mold operating mechanism to travel with the mold carriage and to move radially of the machine with the cam roll, and means actuated by said device for operating the safety mechanism upon failure of said device to move radially with the cam roll, said last mentioned means comprising a cam movably mounted on said column and extending in substantial parallelism with said cam track, said actuating device arranged to travel along said movable cam without actuating the latter during the normal operation of the mold operating mechanism and operable to actuate said cam when prevented from such radial movement.

5. A machine for forming glass articles comprising a stationary column, a mold carriage mounted for rotation about the vertical axis of said column, a mold on the carriage, mold operating mechanism mounted on the carriage for rotation therewith, said mechanism including a cam roll, a stationary horizontal cam track defining a path for the cam roll in its travel around said column and on which said roll runs, means on the mold carriage for guiding the cam roll radially toward and from said axis when actuated by the cam, safety mechanism for stopping the mold carriage upon failure of said mold operating mechanism normally to operate the mold, and an actuating device for said safety mechanism, said device being connected to the mold operating mechanism to travel with the mold carriage and to move radially of the machine with the cam roll, said safety mechanism including a trip device, a cam arm pivotally mounted on said column and extending in the general direction of said cam track, and connections between said arm and trip device for actuating the latter when said arm is swung about its pivot, said actuating device arranged to travel along said cam arm and operable to swing said arm and operate the trip device when said actuating device is prevented from moving radially with the cam roll.

6. A machine for forming glass articles comprising in combination a stationary center column, a mold carriage mounted for rotation about the vertical axis of said column, an electric motor, driving connections between the motor and the carriage, a mold mounted on the carriage, a stationary cam track, a cam roll mounted on the mold carriage to rotate therewith and running on said track, means for guiding the cam roll radially of the mold carriage, said cam track shaped to impart movement to said roll radially of the mold carriage, mold operating mechanism between the cam roll and the mold for opening and closing the latter, said cam roll being connected to said mold operating mechanism, safety mechanism including a switch in the electrical circuit of the motor, means for opening said switch, a latch device for normally holding the switch opening means in inoperative position and preventing opening of the switch, a cam arm movably mounted on said column and operatively connected to said latch, said cam arm extending in substantial parallelism with said cam track, and a pin connected to said mold operating mechanism to travel therewith and normally movable radially of the mold carriage together with the cam roll, said pin arranged to travel along said cam arm, said mold operating mechanism including spring means interposed between the cam roll and the mold, permitting said radial movement of the cam roll without operating the mold and without moving said pin radially of the mold carriage in the event of an obstruction or other means interfering with the said mold operation, said pin when thus prevented from moving radially being operative to actuate said cam arm and thereby operate the trip and effect an opening of the said switch for stopping the motor.

CHARLES B. SMITH.
ALBERT G. LAUCK.